United States Patent
Carroll

(10) Patent No.: US 9,497,794 B2
(45) Date of Patent: Nov. 15, 2016

(54) MODIFICATION OF IDENTIFIER DATA TO IDENTIFY INTERMEDIATE DEVICES

(75) Inventor: Caleb Carroll, Tyne and Wear (GB)

(73) Assignee: Nomad Spectrum Limited, Tyne and Wear (GB)

( * ) Notice: Subject to any disclaimer, the term of this patent is extended or adjusted under 35 U.S.C. 154(b) by 639 days.

(21) Appl. No.: 13/061,006

(22) PCT Filed: Aug. 19, 2009

(86) PCT No.: PCT/GB2009/002024
§ 371 (c)(1),
(2), (4) Date: May 10, 2011

(87) PCT Pub. No.: WO2010/023432
PCT Pub. Date: Mar. 4, 2010

(65) Prior Publication Data
US 2011/0149872 A1 Jun. 23, 2011

(30) Foreign Application Priority Data

Aug. 26, 2008 (GB) .................................. 0815494.5

(51) Int. Cl.
*H04L 12/28* (2006.01)
*H04W 84/00* (2009.01)
(Continued)

(52) U.S. Cl.
CPC ....... *H04W 84/005* (2013.01); *H04W 36/0011* (2013.01); *H04W 36/02* (2013.01);
(Continued)

(58) Field of Classification Search
USPC ....... 370/310–350, 389, 390, 392, 393, 395, 370/395.1–395.54, 400, 401, 428,
(Continued)

(56) References Cited

U.S. PATENT DOCUMENTS 5,875,183 A * 2/1999 Nitadori ........................ 370/328
2006/0229077 A1 10/2006 Monk
(Continued)

FOREIGN PATENT DOCUMENTS

| JP | 2005341453 | 8/2005 |
|---|---|---|
| JP | 2005244590 | 9/2005 |

(Continued)

OTHER PUBLICATIONS

Aghvami, Hamid, "Group Handover Among Heterogeneous Wireless Networks," IEEE MELECON May 16-19, 2006, Benalmedena (Malaga), Spain.

(Continued)

*Primary Examiner* — Ricky Ngo
*Assistant Examiner* — Wei-Po Kao
(74) *Attorney, Agent, or Firm* — Patent Ingenuity, P.C.; Samuel K. Simpson

(57) ABSTRACT

A method provides data communication to a vehicle. The method comprises a first data packet from a device associated with said vehicle at an intermediate device, said first data packet comprising a first identifier identifying said vehicle, modifying said first identifier to identify said intermediate device and forwarding said modified first data packet from said intermediate device to a further device. A communications session between said device associated with said further device is established, and a session identifier is associated with the communications session, and said first data packet comprises said session identifier and said modified data packet comprises said session identifier.

22 Claims, 3 Drawing Sheets

(51) Int. Cl.
  *H04W 36/00* (2009.01)
  *H04W 36/02* (2009.01)
  *H04L 29/12* (2006.01)
  *H04W 80/04* (2009.01)
  *H04W 4/04* (2009.01)

(52) U.S. Cl.
  CPC ...... *H04L 29/1233* (2013.01); *H04L 29/12405* (2013.01); *H04L 61/25* (2013.01); *H04L 61/2528* (2013.01); *H04W 4/046* (2013.01); *H04W 80/04* (2013.01)

(58) Field of Classification Search
  USPC ............... 370/470–476; 455/432.1–444
  See application file for complete search history.

(56) References Cited

U.S. PATENT DOCUMENTS

| | | | | |
|---|---|---|---|---|
| 2007/0275726 | A1* | 11/2007 | Lee | H04W 36/0016 455/436 |
| 2008/0171548 | A1* | 7/2008 | Tsirtsis | H04W 8/04 455/437 |
| 2008/0198858 | A1* | 8/2008 | Townsley | H04L 12/4641 370/401 |
| 2009/0010200 | A1* | 1/2009 | Lauer et al. | 370/316 |
| 2009/0316623 | A1* | 12/2009 | Pettersson et al. | 370/328 |

FOREIGN PATENT DOCUMENTS

| | | |
|---|---|---|
| JP | 2005277537 | 10/2005 |
| JP | 2006332918 | 7/2006 |
| JP | 2007267407 | 10/2007 |
| JP | 2009225135 | 1/2009 |
| JP | 2010515343 | 5/2010 |
| WO | WO2006046896 | 5/2006 |
| WO | 2008088470 | 7/2008 |

OTHER PUBLICATIONS

Holma, Harri, WCDMA for UMTS, 2004.
Perkins, C.E., "Mobile IP," IEE Communications Magazine, vol. 35. Issue 5, May 1997, pp. 84-99.
Pietrowicz, S., et al., "VDTLS—Providing Secure Communications in Vehicie Networks," IEEE INFROCOM Workshops, Apr. 13-18, 2008, pp. 1-6.
Mitsubishi Technical Report, vol. 79, No. 7, p. 477-470.

* cited by examiner

MODIFICATION OF IDENTIFIER DATA TO IDENTIFY INTERMEDIATE DEVICES

RELATED APPLICATOINS

This application a national stage patent application that claims priority to UK patent application serial no. 0815494.5 filed on Aug. 26, 2008.

The present invention relates to a method of providing data communication to a moving object such as a vehicle.

Computers are commonplace in modern society. Many computers are now connected to a worldwide network known as the Internet which allows computers to exchange data with one another. In particular, users can use computing devices to access the worldwide web which provides a vast quantity of information which can be downloaded to a user's computer.

With the increased portability of computers, and the increasing sophistication of mobile devices such as mobile telephones and palmtop computers, there is a growing demand for Internet connectivity while on the move. One response to this demand is based upon devices having built-in long-range telecommunications capabilities, such as devices which make use of mobile telephone networks. While such solutions can be effective, they typically suffer from problems of low bandwidth and incomplete geographic coverage. The problem of low bandwidth is a particular issue when a user wishes to access content comprising a large quantity of data (for example video content). The problem of incomplete geographic coverage is particularly problematic when a user is moving, given that data communication may be interrupted when a signal is lost (for example when a train enters a tunnel).

An alternative method of providing Internet connectivity to mobile devices is based upon the use of access points. Such access points may be provided, for example, in public buildings such as libraries and cafes, and can be accessed by mobile computing devices which are located within a predetermined range of the access point. One common technology used to allow mobile computing devices to connect to such access points is specified by IEEE standard 802.11, and is commonly referred to as WiFi. The use of access points in this way is advantageous in that it allows higher bandwidth connections to be established.

The limitations of systems based upon the connection of mobile devices to mobile telephone networks has led to the proposal that public transport vehicles, such as trains or buses, may be beneficially provided with wireless access points, such that mobile computing devices used by passengers traveling in the vehicle can be provided with Internet connectivity.

The provision of Internet connectivity to a vehicle can be specially tailored to cope with the routes traveled by the vehicle, such as through tunnels and cuttings. More power is available on the vehicle than on a mobile computing device, meaning that systems fitted to vehicles can generally support larger, higher gain antennas than those that are generally installed in portable user devices such as mobile telephones. Furthermore, greater computational power can be used in signal processing in a device associated with a vehicle given that there is room for larger, more powerful processing devices.

Different types of communication links can be used to provide data communication to a vehicle, separately or together, appropriate to the locations through which the vehicle travels. Furthermore, if a vehicle's route is known, the communication links can be managed to provide a higher level of service with greater bandwidth, lower latencies, and fewer losses of connection than if the communications were made directly to individual users using a mobile telephone network. It follows that the provision of a wireless access point on board a vehicle has considerable advantages. Such provision does, however, bring challenges.

It is known to place a number of base stations along a known route, for example alongside a train track. It is further known to connect each base station to a home server via appropriate connections, for example land-based cables. The home server may be connected to the Internet via standard means, for example via cable or via a digital subscriber line (DSL). A communication control unit is placed on the vehicle. As the vehicle travels along the route, the communication control unit wirelessly connects to a particular base station. In this way, the communication control unit can connect to the Internet through the home server, routed via the base stations and any intermediate devices in the network. The communication control unit is adapted to distribute the Internet connection to devices within the vehicle, allowing users to connect to the Internet whilst onboard the vehicle.

Problems exist however when the communication control unit needs to switch from one base station to a different base station along the route, due to, for example, loss of signal from the currently connected base station. In order to direct data packets to the communication control unit, the home server (or a router connected to the home server) must be kept updated with the route through the network from the home server to the communication control unit. This can be achieved using a dynamic routing protocol such as the Routing information Protocol (RIP) or the Open Shortest Path First (OSPF) protocol. Such protocols propogate changes through the network starting from the communication control unit and eventually reaching the home server. Such propagation may cause delays, especially given that it cannot be assured that intermediate routers will respond in an appropriate and timely manner. Such delays may result in loss of data packets.

It is an object of embodiments of the invention to obviate or mitigate at least some of the problems outlined above.

According to a first aspect of the present invention there is provided a method of providing data communication to a vehicle, the method comprising: receiving a first data packet from a device associated with the vehicle at an intermediate device, the first data packet comprising a first identifier identifying the vehicle; modifying the first identifier to identify the intermediate device; and forwarding the modified first data packet from the intermediate device to a further device.

While a communication route to a device associated with the vehicle may vary due to movement of the vehicle, a communication route to an intermediate device to which the device associated with the vehicle can connect, may be fixed. By modifying the first identifier of data packets sent from the device associated with the vehicle to identify the intermediate device, a device that receives that modified data packet can determine an intermediate device to which data packets intended for the device associated with the vehicle should be directed. In this way, a device in a network that wants to send data packets to the device associated with the vehicle need only know the fixed communication route to the intermediate device, not the dynamic route to the device associated with the vehicle. This removes the need for time-consuming dynamic route update mechanisms which may result in data packet loss.

The method may further comprise establishing a communications session between the device associated with the vehicle and the further device, and associating a session identifier with the communications session. Such a communications session may be, for example, a Crypto IP Encapsulation (CIPE) communications session. The communications session may create a virtual private network (VPN) between the device associated with the vehicle and the further device. The first data packet and the modified data packet may comprise the session identifier.

A wireless connection may be established between the device associated with the vehicle and the intermediate device. A wired connection may be established between the intermediate device and the further device.

The further device may be provided with a connection to the Internet, so as to allow Internet connectivity to be provided to the device associated with the vehicle.

The first identifier may be an IP address. Modifying the first identifier may comprise using Network Address Translation (NAT) to modify the first identifier from an IP address of the vehicle to an IP address of the intermediate device.

The method may further comprise receiving a second data packet at the intermediate device comprising the session identifier, the second data packet comprising a second identifier associated with the intermediate device; modifying the second identifier to identify the device associated with the vehicle; and forwarding the second data packet to the device associated with the vehicle. The second data packet may originate at the further device.

The second identifier may be a destination. The second identifier may be an IP address. Modifying the second identifier may be based upon the session identifier included in the second data packet. That is, modifying the second identifier to identify the device associated with the vehicle may comprise determining an identifier of the device associated with the vehicle based upon the session identifier included in the second data packet.

A plurality of wireless connections may be provided between the device associated with the vehicle and a plurality of user devices on board the vehicle. That is, the device associated with the vehicle may act as a wireless access point onboard the vehicle.

According to a second aspect of the present invention there is provided a device for providing data communication to a vehicle, the device comprising: means for receiving a first data packet from a device associated with the vehicle at an intermediate device, the first data packet comprising a first identifier identifying the vehicle, means for modifying the first identifier to identify the intermediate device, and means for forwarding the modified first data packet from the intermediate device to a further device.

According to a third aspect of the present invention there is provided a method of communicating with a mobile device comprising: receiving data originating at a mobile device, the data including an identifier of an intermediate device, storing data associating the identifier of the intermediate device with the mobile device; and transmitting data to the mobile device based upon the stored data.

That is, data originating at the mobile device (e.g. data packets transmitted from the mobile device) can be used to store data indicating an intermediate device, and that data can then be used to transmit data to the mobile device. For example, the stored data can be used such that data to be transmitted to the mobile device is sent to the intermediate device.

The method may further comprise receiving the further data to be transmitted to the mobile device, and forwarding the further data based upon the stored data, for example forwarding the further data packet to the intermediate device.

Receiving data originating at the mobile device may comprise receiving at least one data packet from the intermediate device. The identifier of the intermediate device may be indicated as a source of the at least one data packet. The data originating at the mobile device may further comprise data identifying the mobile device. The data identifying the mobile device may be a session identifier.

The data originating at the mobile device may be received at a first time, wherein the method may further comprise: receiving further data originating at the mobile device at a second time, the data including an identifier of a second intermediate device, the second time being later than the first time. The stored data may be updated to associate the identifier of the second intermediate device with the mobile device.

In this way, an intermediate device associated with the mobile device may be determined based upon data recently received from the mobile device. For example, the intermediate device from which data is most recently received maybe that which is associated with the mobile device. The intermediate device may be identified as a source of a received data packet.

The identifier of the second intermediate device may be an IP address. The further data originating at the mobile device may be received from the further intermediate device.

The or each intermediate device may be a wireless base station, and a wireless connection may be established between the or each wireless base station and the mobile device.

The mobile device may be associated with a vehicle. Wireless connections may be provided between the mobile device associated with the vehicle and a plurality of user devices on board the vehicle. That is, the mobile device may be a wireless access point arranged to provide data connectivity to devices on board the vehicle.

According to a fourth aspect of the present invention, there is provided a method of providing data communication to a vehicle, the method comprising: establishing a connection with a first base station at a first time, and transmitting data packets from the vehicle to the first base station; establishing a connection with a second base station at a second later time, and transmitting data packets from the vehicle to the second base station after the second time; wherein the vehicle is configured to receive data packets from the first base station after the first time and the said second time.

That is when a vehicle connects to a second base station, due to, for example, moving into an area that receives a stronger signal from the second base station, the vehicle may still receive data packets from the first base station. In this way, data packets sent to the vehicle after the vehicle has connected, and started sending data packets to, the second base station, will still be received at the vehicle, thereby mitigating packet loss that may occur if, after the second time, the vehicle were to only send and receive data packets to and from the second base station.

The connections may be wireless connections.

Data packets may also be received from said second base station after said second time.

The method may comprise severing said connection with said first base station at a third time, said third time being later than said second time. Such severing may be caused by movement of the vehicle such that a connection with the first base station is no longer possible or desirable. As such data packets may be received from said first base station and said second base station during a time between said second time and said third time and data packets may not be received from said first base station after said first time.

The first base station and the second base station may each communicate with a further device, and a communications session may be established between said vehicle and said further device. Data packets transmitted from the vehicle to each of said first and second base stations may be part of said communications session and data packets received at the vehicle from each of said first and second base stations may be part of said communications session.

It will be appreciated that aspects of the present invention can be implemented in any convenient way including by way of suitable hardware and/or software. For example, a device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

An embodiment of the invention will now be described, by way of example, with reference to the accompanying drawings, in which.

Figure 1:
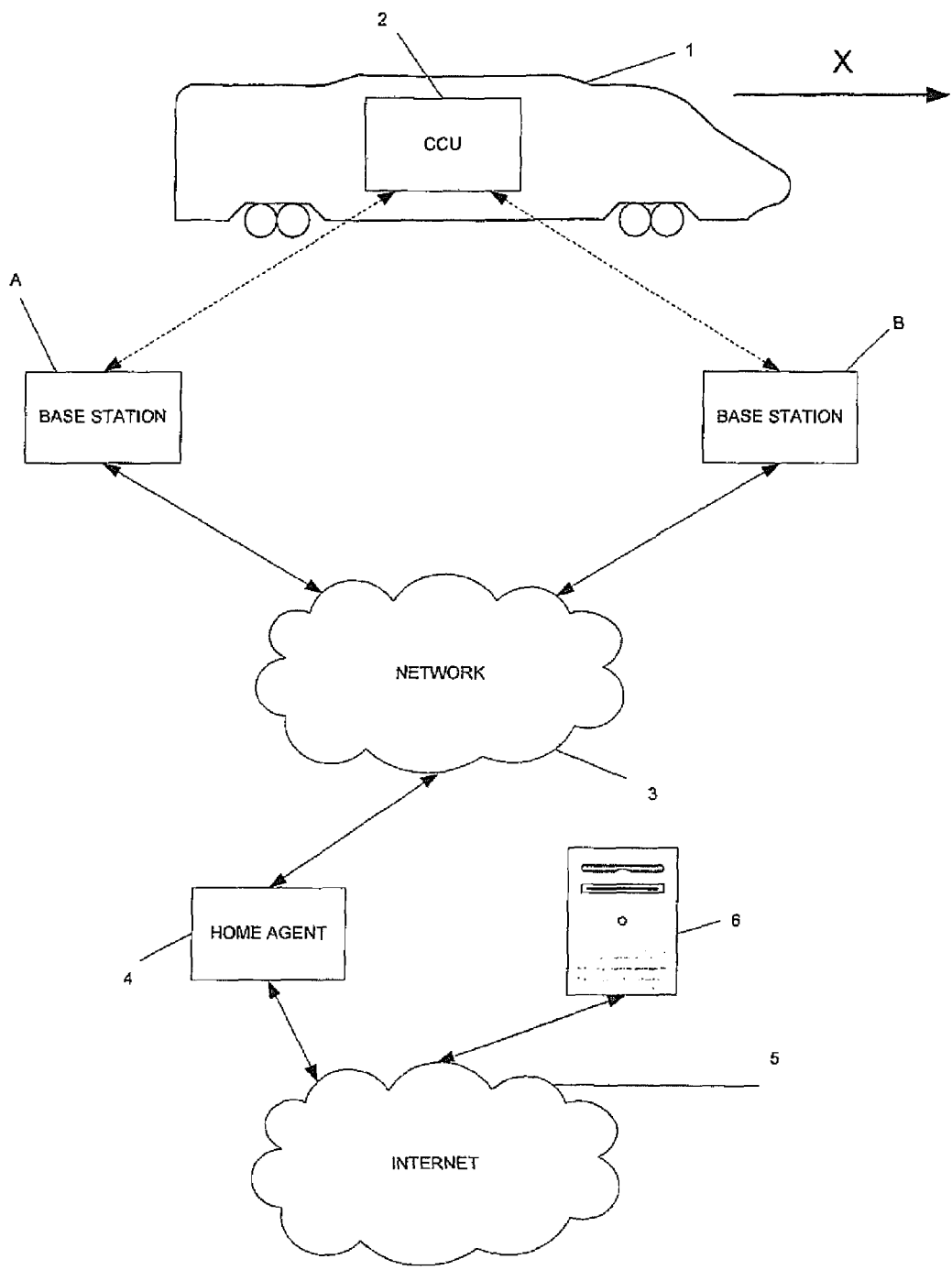
FIG. 1 is a schematic illustration of a network of computing devices.

FIG. 1 shows a network which is used to provide data communication to a train 1. The train is provided with a communications control unit (CCU) 2 which is arranged to connect to base stations A, B which are connected to a network 3. Both the CCU 2 and the base stations A, B are provided with wireless communications interfaces to allow a wireless connection to be established between the CCU 2 and the base stations A, B. A home agent 4 is also connected to the network 3. A virtual private network (VPN) is established between the CCU 2 and the home agent 4, so as to allow data packets to be securely exchanged between the CCU 2 and the home agent 4.

The home agent 4 is connected to the Internet 5. A host computer 6 is also connected to the Internet 5. The connection of the CCU 2 to the home agent 4 through a VPN means that from the point of view of computers connected to the Internet 5 (for example the host 6), all traffic is seen to emanate from the home agent 4, such that computers connected to the Internet 5 need not be concerned with details of the communication between the home agent 4 and CCU 2. Instead, computers connected to the Internet 5 can simply deliver data packets to the home agent 4 which can then process received data packets to ensure that such data packets are properly forwarded to the CCU 2.

The CCU 2 is arranged to provide wireless network connectivity on board the train 1. In this way passengers travelling on the train 1 can use mobile computing devices (such as laptop and palmtop computers, for example) to connect to the CCU 2 and thereby obtain access to the Internet 5. The connection between the mobile computing devices can take any suitable form, but may be in accordance with IEEE standard 802.11.

Although details of the connection between the home agent 4 and the CCU 2 need not be considered by computers connected to the Internet 5, it will be appreciated that the home agent 4 needs to be able to properly route data packets to and from the CCU 2.

As the train 1 moves, it connects to different base stations. Each base station has a finite area within which it can receive and transmit data, and it is preferred that the finite areas overlap, such that there is a time during travel of the train during which the train is able to communicate with more than one of the base stations. As an example, while the CCU 2 is connected to the base station A at a first time, as the train moves in the direction of the arrow X, the CCU 2 is later connected to the base station B. The home agent therefore requires a mechanism of locating the CCU 2 given that it may be connected to different base stations at different times.

One known method for determining routes uses the router information protocol (RIP). This protocol can be used to propagate changes in routes to be followed from the CCU 2 to the home agent 4 through the network. The propagation of route changes is triggered when the base station to which the CCU 2 is connected changes. It will however be appreciated that such propagation will take some time, and there is a danger that some data packets will be incorrectly routed. Furthermore, in such an arrangement a CCU is connected only to a single base station at a particular point in time. Such an approach also suffers from problems from the point of view of scalability. Similar problems exist for other dynamic routing protocols, such as the Open Shortest Path First protocol (OSPF).

Figure 2:
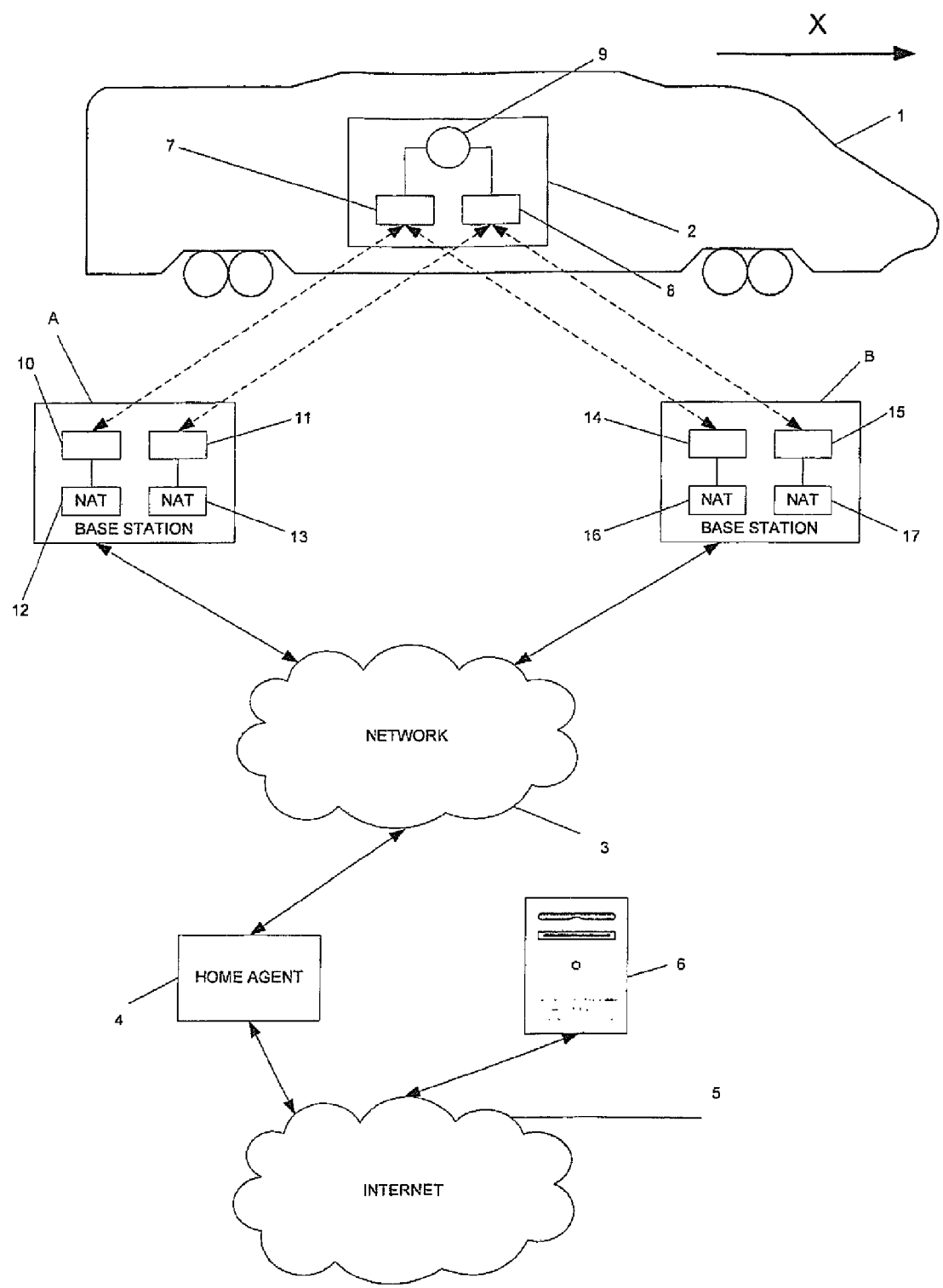
FIG. 2 is a schematic illustration showing components of the network of FIG. 1 in further detail.

FIG. 2 shows the network of FIG. 1, in which some components are shown in further detail. More particularly, it can be seen that the CCU 2 comprises a router 9 connected to two wireless bridges 7, 8. The wireless bridge 7 is arranged to transmit and receive data at a first frequency, while the wireless bridge 8 is arranged to transmit and receive data at a second frequency.

The base station A is similarly provided with two wireless bridges 10, 11, the wireless bridge 10 being arranged to transmit and receive data at the first frequency while the wireless bridge 11 is arranged to transmit and receive data at the second frequency. The base station A further comprises two network address translation (NAT) devices 12, 13, such that the NAT device 12 is connected to the wireless bridge 10, while the NAT device 13 is connected to the wireless bridge 11.

The base station B is configured similarly to the base station A. More specifically, the base station B comprises two wireless bridges 14, 15 respectively arranged to transmit and receive data at different frequencies, and each of the wireless bridges 14, 15 is connected to a respective NAT device 16, 17. The NAT devices 12, 13, 16, 17 may be, for example, NAT capable network switches, such as a DI-604 available from D-Link Corporation, Taipei, Taiwan.

The NAT devices 12, 13, 16, 17 are arranged to receive data packets from their respective wireless bridge and forward such data packets onwards over the network 3. As is well known, data packets often include a header including a first field identifying a source of the data packet and a second field identifying the destination of the data packet. Routinely, data packets generated by the CCU 2 will include within their headers data indicating the address of the CCU 2 as a source address.

In the present case data packets received at the NAT devices are Internet Protocol (IP) data packets and include a field indicating an IP address of a device from which the data packet emanated (i.e. the CCU 2). The NAT devices are arranged to modify received data packets before the data packets are forwarded over the network 3, by modifying the source address within the data packets. In this way, the home agent 4 receives data packets which appear (based upon their source address) to emanate from one of the NAT devices, not from the CCU.

When NAT devices are used in this way, the home agent 4, and indeed any other devices connected to the network 3 need not take any action to modify routes which data packets follow when a CCU connects to a different base station. Instead, as is described in further detail below, the home agent 4 simply stores data indicating a NAT device associated with a particular CCU when data packets from the CCU are received and forwards data packets intended for that CCU to the relevant NAT device.

It will be appreciated that the use of NAT devices in the manner described above means that as a CCU 2 moves from being connected to the base station A to being connected to the base station B, the IP address from which packets originating from the CCU 2 appear to emanate will change. More specifically, while initially such data packets will appear to emanate from one of the NAT devices 12, 13 and will include the IP address of one of the NAT devices 12, 13, when the CCU 2 connects to the base station B, data packets originating from the CCU 2 will now include the IP address of one of the NAT devices 16, 17. Such changes in the IP address associated with data packets originating from the CCU 2 could cause problems from the point of view of the home agent 4 correctly identifying the CCU 2 so as to ensure that data packets are processed as part of the correct session.

It was indicated above that a VPN was established between the CCU 2 and the home agent 4. By associating a unique session identifier with a session between the CCU 2 and the home agent 4 which remains the same regardless of changes in IP address, it can be seen that data packets can be correctly processed. In one embodiment of the invention this is achieved using the CIPE (Crypto IP Encapsulation) protocol which allocates a unique port number to each session. The port number remains the same regardless of changes in IP addresses. As such, the port number allows data packets to be correctly routed in the network of FIG. 2.

Figure 3:
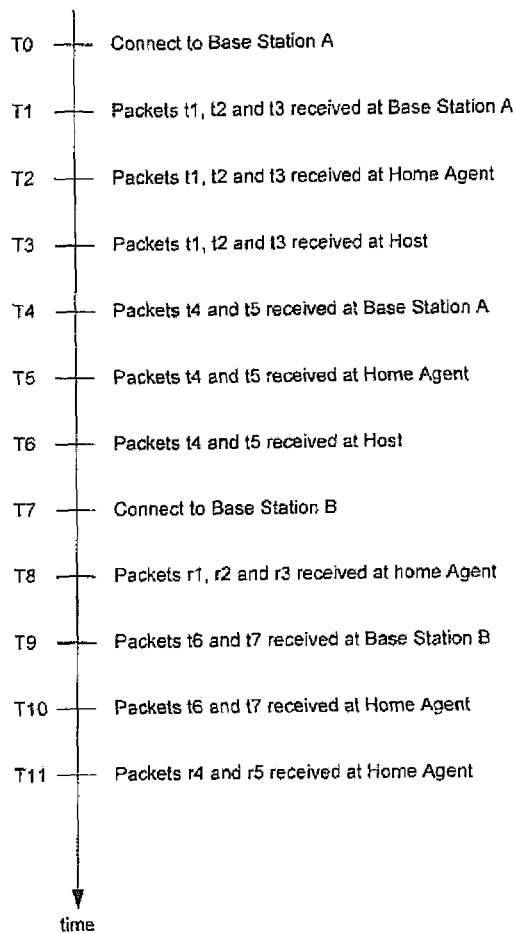
FIG. 3 is a timing diagram showing the processing of data packets in the network of FIG. 2.

FIG. 3 is a schematic illustration showing a transfer of data packets between the CCU 2 and the home agent 4.

At time T0, the CCU 2 connects to the base station A. This involves a connection being established between the wireless bridge 7 of the CCU 2 and the wireless bridge 10 of the base station A, or the wireless bridge 8 of the CCU 2 and the wireless bridge 11 of the base station A.

At time T1, data packets t1, t2, t3 are received at the base station A from the CCU 2. These data packets are forwarded from the base station A to the home agent 4 over the network 3, and are received at the home agent 4 at time T2, The home agent 4 receives the data packets t1, t2, t3 from one of the NAT devices 12, 13 of the base station A. The home agent 4 identifies both that the data packets are associated with the CCU 2 (using a session identifier included within the received data packets) and also that the IP address from which the data packets were received is that of one of the NAT devices 12, 13. The home agent 4 stores data indicating that any data packets to be sent from the home agent 4 that are associated with the determined session identifier should be sent to the IP address from which the data packets t1, t2, t3 were received, that is the IP address associated with one of the NAT devices 12, 13.

Having been received at the home agent 4, the data packets t1, t2, t3 are forwarded to the host 6 over the Internet 5. The data packets t1, t2, t3 are received at the host 6 at time T3.

At time T4, data packets t4, t5 are received at the base station A from the CCU 2. The data packets t4, t5 are forwarded to the home agent 4 where they are received at time T5. The home agent 4 determines that the data packets emanate from the CCU 2 based upon the session identifier included in the data packets t4, t5, and determines an IP address of the NAT device from which the data packets were received. Given that the data packets t4, t5 were received at the home agent 4 from the base station A, the home agent 4 need not update any stored data, on the basis that the home agent 4 already stores data associating the IP address associated with one of the NAT devices 12, 13 of the base station A with the appropriate session identifier.

The data packets t4, t5 are forwarded from the home agent 4 to the host 6 where they are received at time T6.

At time T7, the CCU 2 connects to the base station B. This happens because the train 1 has moved in the direction of the arrow X such that a better connection to the network 3 can now be achieved using the base station B, rather than the base station A.

At time T8 data packets r1, r2, r3 which are generated by the host 6 in response to receipt of the data packets t1, t2, t3 are received at the home agent 4. The home agent 4 determines that the data packets r1, r2, r3 are destined for the CCU 2 based upon a session identifier included in the data packets r1, r2, r3. The home agent 4 further determines that data packets destined for the CCU 2 should be forwarded to one of the NAT devices 12, 13 associated with the base station A. This determination is based upon data stored when the most recent data packets (t4, t5) were received by the home agent 4, the stored data indicating an IP address currently associated with the CCU 2, that IP address being associated with one of the NAT devices 12, 13 of with the base station A.

It can therefore be seen that although the CCU 2 connected to the base station B at time T7, the data packets r1, r2, r3 are sent to the base station A at time T8. This is because the home agent 4 is configured to send data packets to the IP address from which data packets associated with the relevant session were most recently received. Thus, although the CCU 2 is now connected to the base station B, the data packets r1, r2, r3 are still sent to the base station A given that no data packets have yet been received from the CCU 2 indicating the IP address of one of the NAT devices 16, 17 of the base station B as their source.

The data packets r1, r2, r3 are still properly received by the CCU 2 because the CCU 2 establishes a connection with the base station B pro-actively before the connection with the base station A fails. As such, even when a connection with a different base station has been established, a connection with a base station to which the CCU was previously connected is not severed.

At time T9, data packets t6, t7 are received at the base station B from the CCU 2. The base station B forwards the data packets to the home agent 4. Before doing so, the data packets t6, t7 are processed at one of the NAT devices 16, 17 such that the data packets have a source IP address associated with one of the NAT devices 16, 17 rather than the CCU 2. At time T10 the data packets t6, t7 are received at the home agent 4.

Upon receiving the data packets t6, t7 at the home agent 4, it is determined that the data packets t6, t7 are associated with the CCU 2 based upon their session identifier. It is further determined that the packets were received from one of the NAT devices 16, 17 associated with the base station B. The home agent 4 therefore modifies its stored data such that the IP address associated with the session involving the CCU 2 is that of one of the NAT devices 16, 17 of the base station B rather than the IP address of one of the NAT devices 12, 13 of the base station A.

At time T11 data packets r4, r5 are received at the home agent 4 from the host 6. These data packets were generated in response to the data packets t4, t5. The home agent 4 determines that the data packets r4, r5 are associated with a session established between the home agent 4 and the CCU 2, based upon a session identifier. Given that data packets associated with that session were last received (at time T10) via the base station B, the data stored by the home agent 4 indicates that data packets intended for the CCU 2 should be sent to one of the NAT devices 16, 17 associated with the base station B, and forwards the data packets appropriately. It can thus be seen that although the data packets r4, r5 are in response to the data packets t4, t5 which were received via the base station A, the data packets r4, r5 are sent to the base station B given that this is the base station from which data packets associated with the relevant session were most recently received.

Referring to FIG. 2, it was explained that the wireless bridges 7, 8 on board the train 1 are connected to a router 9. These wireless bridges are Layer 2 devices. To prevent problems, such as broadcast storms, arising from bridging loops between the CCU and the base stations, each bridge is separated from each other bridge by means of Layer 3 devices, such that each Layer 2 bridge is only accessible via a separate IP address. The separation of Layer 2 devices may be achieved by any appropriate means, such as the use of port based virtual LANs; or by connecting each bridge through individual, physical Ethernet ports. Additionally or alternatively, bridging loops may be controlled by the use of appropriate filtering between ports of the Layer 2 devices.

It was further explained that each of the wireless bridges 7, 8 operate on a different frequency, and that each base station A, B contains a wireless bridge operating on corresponding frequencies. Such an arrangement helps to ensure that data packets sent between the CCU and the base stations follow the correct wireless path. Furthermore, where switches are used to direct data packets it is advantageous to use managed switches as these allow more control over Layer 2 traffic.

It will be appreciated that the base stations A, B provide wireless communication to the CCU 2. A variety of different base stations can be used in embodiments of the invention. Any base station not having network address translation capability is provided with an associated device providing such capability. From the preceding discussion it can be seen that each device providing network address translation capability need have its own unique IP address.

CCUs of different trains have unique IP addresses, and each of the wireless bridges associated with a CCU has different address. However the addresses of the wireless bridges associated with a CCU need not be unique amongst a plurality of CCUs.

It will be appreciated that while the preceding description has treated the network 3 and the Internet 5 as distinct networks, in some embodiments, the base stations A, B may connect to the home agent 4 via the Internet 5.

In the preceding description it has been explained that the CCU 2 connects to base stations A and B. These base stations can conveniently be provided at the side of a track along which the train travels. In alternative embodiments of the invention the CCU 2 may be configured to communicate with base stations associated with respective mobile telephone networks such that the CCU is configured to connect to different mobile telephone networks as the train moves. Similarly, the CCU 2 can be adapted for connection to satellite networks.

It has been explained in the preceding description that the CCU 2 is arranged to provide wireless network connectivity onboard the train 1 such that passengers travelling on the train 1 can use mobile computing devices to connect to the CCU 2. It will be appreciated that in some embodiments of the invention the CCU 2 is not adapted to provide wireless network connectivity onboard the train. Such embodiments can be useful in providing telemetry services and closed circuit television.

The preceding description has been concerned with an embodiment in which the CCU is associated with a train. It will be appreciated that the methods described herein are in no way limited to trains, but are instead widely applicable to any situation in which data communication is provided to a moving person or object. In particular, the methods described can be used to provide data communication to other vehicles (e.g. busses and cars).

I claim:

1. A method of providing data communication to a vehicle, the method comprising:
at a device associated with the vehicle:
establishing a communications session between the device associated with the vehicle and a further device, the communications session having an associated session identifier identifying the device associated with the vehicle;
at a first intermediate device not aboard the vehicle:
receiving a first data packet from the device associated with said vehicle, said first data packet comprising a first identifier identifying said device associated with the vehicle;
modifying said first identifier to identify said first intermediate device;
forwarding said modified first data packet from a first intermediate device to the further device;
at a second intermediate device not aboard the vehicle:
receiving a second data packet from the device associated with the vehicle, the second data packet comprising a second identifier identifying the device associated with the vehicle;
modifying the second identifier to identify the second intermediate device;
forwarding the modified second data packet from the second intermediate device to the further device;
wherein said first data packet and said second data packet comprise said session identifier and said modified first data packet and said modified second data packet comprise said session identifier.

2. The method of claim 1, wherein said communications session in a Crypto IP Encapsulation (CIPE) communications session.

3. The method of claim 1, further comprising:
establishing a wireless connection between said device associated with said vehicle and said first intermediate device.

4. The method of claim 1, further comprising establishing a wired connection between said first intermediate device and said further device.

5. The method of claim 1, further comprising providing said further device with a connection to the Internet.

6. The method of claim 1, wherein said first identifier is an IP address.

7. The method of claim 1, wherein modifying said first identifier comprises using Network Address Translation (NAT) to modify said first identifier from an IP address of said device associated with said vehicle to an IP address of said first intermediate device.

8. The method of claim 1, further comprising:
receiving a third data packet at the first intermediate device comprising said session identifier, said third data packet comprising a third identifier associated with the intermediate device;
modifying said third identifier to identify the device associated with the vehicle; and
forwarding said third data packet to the device associated with the vehicle.

9. The method of claim 8, wherein said third identifier is a destination.

10. The method of claim 8, wherein said third identifier is an IP address.

11. The method of claim 8, wherein modifying said third identifier is based upon said session identifier.

12. The method of claim 8, further comprising providing wireless connections between said device associated with said vehicle and a plurality of user devices on board said vehicle.

13. A system for providing data communication to a vehicle, the apparatus comprising a first intermediate device not aboard the vehicle, a second intermediate device not aboard the vehicle and a device associated with the vehicle:
the first intermediate device comprising a first memory storing processor readable instructions; and
a processor configured to read and execute instructions stored in said first memory,
wherein said instructions comprise instructions controlling the processor to:
receive a first data packet from the device associated with said vehicle, said first data packet comprising a first identifier identifying said device associated with the vehicle,
modify said first identifier to identify said first intermediate device, and
forward said modified first data packet from said first intermediate device to a further device,
the second intermediate device comprising a second memory storing processor readable instructions; and
a processor configured to read and execute instructions stored in the second memory, wherein said instructions comprise instructions controlling the processor to:
receive a second data packet from the device associated with said vehicle, said second data packet comprising a second identifier identifying said device associated with the vehicle, modify said second identifier to identify said second intermediate device, and forward said modified second data packet from said second intermediate device to a further device, the device associated with the vehicle comprising a processor configured to read and execute instructions stored in a third memory, wherein said instructions in said third memory comprise instructions controlling the processor to:
establish a communications session between said device associated with said vehicle and said further device, and to associate a session identifier with the communications session, said session identifier identifying the device associated with the vehicle;
wherein said first data packet and said second data packet comprise said session identifier and said modified first data packet and said modified second data packet comprise said session identifier.

14. A method of communicating with a mobile device associated with a vehicle comprising, at a further device:
establishing a communications session between the further device and the mobile device, said communications session having an associated session identifier;
receiving at a first time first data originating at the mobile device via a first intermediate device not aboard the vehicle, said data including an identifier of the first intermediate device and said session identifier;
storing data associating said identifier of said first intermediate device with said session identifier, said session identifier identifying said mobile device;
transmitting further data to said mobile device based upon said stored data;
receiving at a second time second data originating at said mobile device via a second intermediate device not aboard the vehicle and distinct from the first intermediate device, said data including said session identifier and an identifier of the second intermediate device, and said second time being later than said first time; and
updating said stored data to associate the identifier of the second intermediate device with said session identifier, said session identifier identifying said mobile device.

15. The method of claim 14, further comprising receiving said further data, and forwarding said further data based upon said stored data.

16. The method of claim 14, wherein receiving data originating at said mobile device comprises receiving at least one data packet from said first intermediate device, wherein said identifier of said first intermediate device is indicated as a source of said at least one data packet.

17. The method of claim 14, wherein said identifier of the second intermediate device is an IP address.

18. The method of claim 14, wherein said second data originating at said mobile device is received from said second intermediate device.

19. The method of claim 14, wherein each intermediate device is a wireless base station, and a wireless connection is established between each wireless base station and said mobile device.

20. The method of claim 14, wherein said mobile device is associated with a vehicle, the method further comprising providing wireless connections between said mobile device associated with said vehicle and a plurality of user devices on board said vehicle.

21. A non-transitory tangible computer readable medium carrying a computer program comprising computer readable instructions adapted to cause a computer to:
establish a communications session with a mobile device associated with a vehicle, said communications session having an associated session identifier;
receive at a first time first data originating at the mobile device via a first intermediate device not aboard the vehicle, said data including an identifier of the first intermediate device and said session identifier;
store data associating said identifier of said first intermediate device with said session identifier, said session identifier identifying said mobile device;
transmit further data to said mobile device based upon said stored data
receive at a second time second data originating at said mobile device via a second intermediate device not aboard the vehicle and distinct from the first intermediate device, said data including said session identifier and an identifier of the second intermediate device, and said second time being later than said first time; and update said stored data to associate the identifier of the second intermediate device with said session identifier, said session identifier identifying said mobile device.

22. Apparatus for communicating with a mobile device associated with a vehicle, the apparatus comprising:
a memory storing processor readable instructions; and
a processor configured to read and execute instructions stored in said memory;
wherein said instructions comprise instructions controlling the processor to:
establish a communications session between the apparatus and the mobile device, said communications session having an associated session identifier;
receive at a first time first data originating at the mobile device via a first intermediate device not aboard the vehicle, said data including an identifier of the first intermediate device and said session identifier;
store data associating said identifier of said first intermediate device with said session identifier, said session identifier identifying said mobile device;
transmit further data to said mobile device based upon said stored data;
receive at a second time second data originating at said mobile device via a second intermediate device not aboard the vehicle and distinct from the first intermediate device, said data including said session identifier and an identifier of the second intermediate device, and said second time being later than said first time; and
update said stored data to associate the identifier of the second intermediate device with said session identifier, said session identifier identifying said mobile device.

* * * * *